(12) United States Patent
Roberto Gomes et al.

(10) Patent No.: US 8,366,910 B2
(45) Date of Patent: Feb. 5, 2013

(54) PROCESS FOR HYDROCONVERSION OF A MIXTURE OF ORGANIC OILS OF DIFFERENT ORIGINS

(75) Inventors: Jefferson Roberto Gomes, Rio de Janeiro (BR); Raissa Maria Cotta Ferreira da Silva, Rio de Janeiro (BR); Rogerio Oddone, Rio de Janeiro (BR); Adriana de Souza Ferreira, Niteroi (BR); Nelmo Furtado Fernandes, Rio de Janeiro (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 959 days.

(21) Appl. No.: 12/298,071

(22) PCT Filed: Apr. 26, 2007

(86) PCT No.: PCT/GB2007/001540
§ 371 (c)(1),
(2), (4) Date: Feb. 6, 2009

(87) PCT Pub. No.: WO2007/125332
PCT Pub. Date: Nov. 8, 2007

(65) Prior Publication Data
US 2009/0301932 A1    Dec. 10, 2009

(30) Foreign Application Priority Data
Apr. 26, 2006 (BR) .................................. 0601460

(51) Int. Cl.
*C10G 65/12*    (2006.01)
*C10G 45/58*    (2006.01)

(52) U.S. Cl. ................ 208/89; 208/15; 208/59; 585/14; 585/240

(58) Field of Classification Search .................... 208/15, 208/58, 59, 88, 89; 585/14, 240
See application file for complete search history.

(56) References Cited

U.S. PATENT DOCUMENTS

| | | | |
|---|---|---|---|
| 2,163,563 A | 6/1939 | Schrauth | |
| 4,992,605 A | 2/1991 | Craig et al. | |
| 6,136,050 A * | 10/2000 | Nakajima et al. | 44/393 |
| 6,235,190 B1 * | 5/2001 | Bertram | 208/59 |

FOREIGN PATENT DOCUMENTS

| | | |
|---|---|---|
| BR | PI 8 304 794 A | 4/1985 |
| EP | 1 396 531 A2 | 3/2004 |
| EP | 1 693 432 A1 | 8/2006 |

* cited by examiner

*Primary Examiner* — Walter D Griffin
*Assistant Examiner* — Renee E Robinson
(74) *Attorney, Agent, or Firm* — Sughrue Mion, PLLC

(57) ABSTRACT

A process is described for hydroconversion of a mixture of organic oils of different origins in a conventional hydrotreatment unit, constituted by at least two catalyst beds, under moderately severe process conditions to obtain diesel fuel oil. The process includes injection of a stream of oil of animal or plant origin, with independently adjusted flow rates, from the second catalyst bed of the hydrotreatment unit onwards, in accordance with the variations in temperature observed in each of the catalyst beds after the first bed. The process is applicable to conventional hydrotreatment units, and makes it possible to overcome the effects of the highly exothermic nature of hydroconversion reactions in oils of animal and/or plant origin in hydrotreatment process for obtaining specified diesel fuel oil.

11 Claims, 3 Drawing Sheets

PROCESS FOR HYDROCONVERSION OF A MIXTURE OF ORGANIC OILS OF DIFFERENT ORIGINS

FIELD OF THE INVENTION

The field of the present process for hydroconversion of a mixture of organic oils is hydrotreatment of a feedstock under process conditions of moderate severity to produce diesel oil specified as fuel. More specifically, it relates to a process for hydroconversion of a feedstock which includes organic oils of animal and/or plant origin mixed with mineral oil, which makes it possible to avoid the negative effects of the highly exothermic nature of the hydroconversion reactions in a hydrogen treatment process for producing diesel oil, with improvement in the quality of the product and in atmospheric emissions when used in engines.

BASIS OF THE INVENTION

In the petroleum refining industry, hydrotreatment (HDT) processes are widely employed in order to improve the properties of the streams from both the distillation processes and the cracking processes. The distillation temperature range of typical feedstocks in HDT units varies from that for streams of naphtha to that for streams of heavy vacuum gas oil. The product of the process has essentially the same distillation temperature range as the feedstock, despite the possible production of lighter by-products by hydrocracking reactions.

Broadly speaking, an HDT process includes passing a stream of hydrocarbon together with a stream of hydrogen inside a fixed bed catalytic reactor under conditions of a high pressure of hydrogen of 1 to 15 MPa and a temperature of 280° C. to 400° C. Because exothermal reactions are involved and the reactor operates adiabatically, the temperature rises along the catalyst bed, due to the large dimensions involved. However, the process imposes limits on the temperature rise through the catalyst bed, normally to 40° C., in order to minimize deactivation of the catalyst and guarantee a service life of at least one to two years. When the heat of reaction is very high and the temperature increase is excessive, the reactor can be designed with a second bed, and a stream of recycled hydrogen can be injected in order to decrease the inlet temperature of the subsequent bed and also to replace the hydrogen consumed by the process. When there is more than one catalyst bed, the rise in temperature is greater in the first bed, due to the presence of more reactive compounds and a greater concentration of reactants, and consequently a higher reaction rate, with the more refractory reactants continuing to react at a lower reaction rate in the subsequent beds.

Hydrotreatment of organic oils of animal and/or plant origin mixed with mineral oil, in HDT units, is one alternative for incorporating streams which add quality to diesel oil as fuel produced in an oil refinery. The process of hydroconversion of mixtures of organic oils of different origins gives rise to reactions of the fatty acids which constitute organic oils of animal and/or plant origin, producing linear paraffin hydrocarbons. These hydrocarbons significantly improve the properties of diesel oil, principally as regards cetane number and density.

Patent Application PI0500591 by the applicant, relates to a process for hydrotreatment of feedstocks of natural, animal or plant, oils and/or fats mixed in proportions of 1 to 75% by weight with mineral oil fractions having a distillation temperature in the diesel range. The resulting product is specified as diesel fuel and has an improved cetane index and a density lower than that obtained by hydrotreatment of only mineral oil from standard streams from refining.

One of the most relevant factors in the hydroconversion process, which make it difficult to use organic oil of animal and/or plant origin mixed with mineral oil, in hydrotreatment units is the highly exothermic nature of the hydroconversion reactions in oil of animal and/or plant origin. When such oil is injected into a first bed, the highly exothermic nature of the hydroconversion reactions can represent an exaggerated increase in temperature, complicating operation, decreasing the service life of an HDT unit and limiting the quantity of plant oil in the feedstock of the unit.

Therefore, in addition to developing processes for hydroconversion of oils of animal or plant origin mixed with mineral oil in order to obtain diesel fuel oil with improved quality, there is also still the need for a process which can minimize the effects of the highly exothermic nature of the reactions, and such a process is described and claimed below.

SUMMARY OF THE INVENTION

In the broad sense, the invention comprises a process for hydroconversion of organic oils of animal and/or plant origin mixed with mineral oil which is ordinarily submitted to a hydrotreatment process in an oil refinery.

A conventional hydrotreatment unit is used, constituted by at least two catalyst beds, under moderately severe process conditions, to produce diesel fuel oil which presents improved qualities compared with that obtained by hydrotreatment under equivalent conditions of mineral oil alone.

The process comprises injection of a stream of mineral oil upstream of a first catalyst bed of a reactor of a hydrotreatment unit, under process conditions. This stream passes through all of the subsequent beds of the unit for catalysed hydroconversion in the presence of a stream rich in hydrogen. A stream of organic oil of animal and/or plant origin is injected, at flow rates adjusted independently, upstream of the catalyst beds after the first bed, to react in a concurrent mixture with the oil from the first bed, which passes through all of the subsequent catalyst beds of the unit. The products of the hydroconversion reactions are obtained at the outlet of the final reactor of the unit, and separated into the following fractions: a) a liquid water fraction b) a gaseous fraction, which is recycled to the reaction after treatment and replenishment of the hydrogen reactant; c) a liquid fraction of hydrocarbons and dissolved gases which, after removing the dissolved gases, is recovered as a product specified as diesel fuel oil, with a cetane number greater than 42 and a density less than 0.88.

The process offers a solution for the highly exothermic nature of hydrotreatment of oils of animal and/or plant origin processed in a mixture with mineral oil, which could adversely affect the integrity of the first catalyst bed of the HDT unit if the mixture is integrally injected into the first catalyst bed.

The process also offers an increase in the global production of HDT units already installed, since the organic oil of animal and/or plant origin can be co-processed in a proportion of 5 to 30% by volume with a feedstock originally constituted only by mineral oil, adding volume to the diesel oil produced in the unit.

In addition, the process offers a specific diesel oil product with improved qualities, which allows fpr procedures for mixing other less noble fractions, while maintaining a product destined for use in diesel engines.

DETAILED DESCRIPTION OF THE INVENTION

Figure 1:
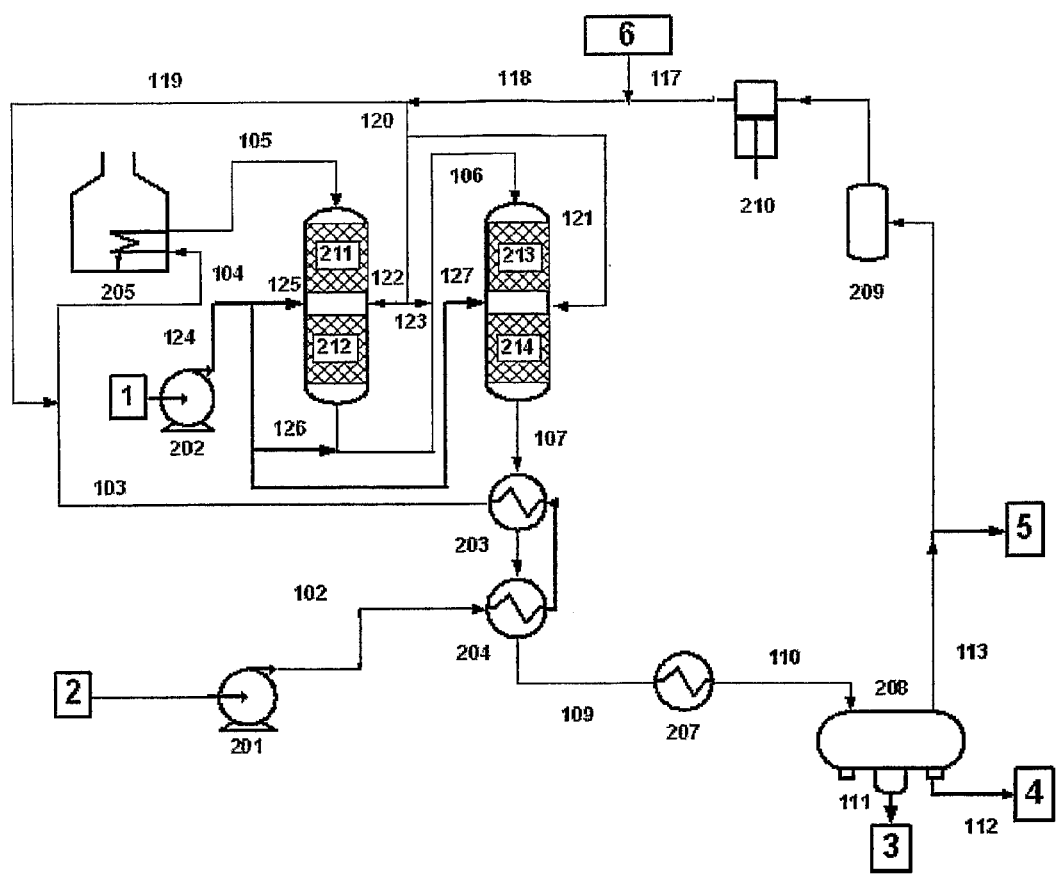
FIG. 1 is a process diagram of the process of the present invention for an HDT unit with four sequential catalyst beds, in order to facilitate understanding of the detailed description of the process.

The principal reactions which occur in a conventional HDT process are as follows: hydrogenation of olefins (HO), hydrodesulphurization (HDS) with the formation of $H_2S$, hydrodenitrogenation (HDN) with formation of $NH_3$, hydrodeoxygenation (HDO) with formation of $H_2O$ and hydrogenation of aromatic compounds (HDA). In addition, low levels of hydrocracking conversion (HCC) can be expected, producing light gases (C1 to C4). The extent to which each one of these reactions occurs depends on the severity of the process (pressure, reaction temperature and space velocity in the reactor).

The hydroconversion reactions of streams of mineral oil, and especially hydrogenation of olefins, are exothermic.

The development of the hydroconversion process which follows is based on reactions which can occur during the processing of an organic oil of plant and/or animal origin, the molecular structure of the hydrocarbons constituting the feedstock and the characteristics of the catalyst used in the process.

Catalysts useful for this process can be obtained commercially in the form of metallic oxides (Ni and Mo, Co and Mo, Ni and W), supported on gamma alumina and later converted to sulfides inside the reaction in the step termed sulfidation. The process conditions include a temperature of 280 to 370° C., a partial pressure of hydrogen of 4 to 10 MPa and a space velocity of 0.5 to 2.5 $h^{-1}$.

Organic oils of plant and/or animal origin useful for the process comprise: a) plant oils selected from soybean oil, castor oil and groundnut oil; and b) animal oils selected from those which have free fatty acid concentration greater than 85%.

Soybean oil is preferably used, since it is the oil in greatest supply at the lowest price on the Brazilian market. Degummed oil is recommended, since whole soybean oil contains lecithin at ca. 3.2%, and is rich in phosphorus and nitrogen, which can deactivate the catalyst.

One of the most relevant factors in the hydroconversion process, which makes it difficult to use organic oil of animal and/or plant origin mixed directly with mineral oil customarily used in hydrotreatment units, for producing diesel oil, is the highly exothermic nature of hydroconversion reactions of the fatty acids constituting oils of animal and/or plant origin. Table 1 illustrates this for an oil A (diesel oil) and an oil B (diesel oil mixed with 10% soybean oil).

TABLE 1

|  | Oil A | Oil B |
|---|---|---|
| Heat of reaction, kcal/kg | 34.6 | 61.6 |
| $H_2$ consumed, $Nm^3/m^3$ | 41.8 | 81.5 |

This highly exothermic mature of the hydroconversion reactions of the organic molecules of oils of animal and/or plant origin can represent an exaggerated increase in temperature on the first catalyst bed of a hydrotreatment unit, complicating operation, and decreasing the service life of HDT units which process mixtures of organic oils of different origin injected directly into the catalyst bed.

In experiments conducted in a pilot plant operating adiabatically, high reaction rates are observed for soybean oil; and this oil undergoes practically complete conversion in the first catalyst bed.

Figure 2:
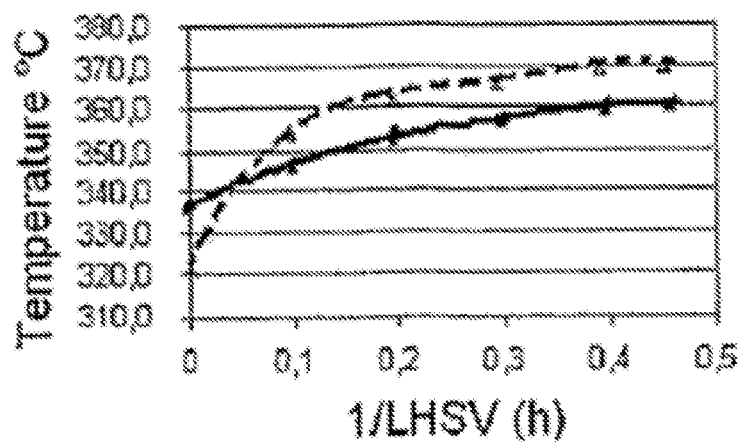
FIG. 2 illustrates the conversion of organic oil of animal and/or plant origin in the first layers of the catalyst bed in the hydroconversion of a mineral oil.

Complete conversion of organic oil of animal and/or plant origin can be expected in the first layers of the catalyst bed, as illustrated in FIG. 2 for the hydroconversion of a mineral oil without the addition of soyabean oil and with addition of soybean oil at 10% by weight (see broken line).

Thus, the principal object of the process of the present invention is to solve the problem of the highly exothermic nature of the hydroconversion reactions of oils of animal and/or plant origin processed in a mixture with mineral oil, which, can adversely affect the integrity of the first catalyst bed of the HDT unit.

The solution found in order to avoid the problems caused by the highly exothermic nature of the feedstock was to inject the stream of oil of animal and/or plant origin independently of the stream of mineral oil, which together constitute the overall feedstock of the HDT unit.

The supply of mineral oil is injected upstream of the first catalyst bed and passes through all of the subsequent catalyst beds in the HDT unit and the supply of oil of animal and/or plant origin is injected at independently adjusted rates upstream of the catalyst beds after the first bed.

The most reactive reactants in a supply of organic oils can be considered to be converted in the first catalyst layer.

The stream of oil of animal and/or plant origin can be injected pure or diluted with the product of the process or with some stream of mineral oil which is less reactive to hydrotreatment. Injection is preferably carried out together with the stream of recycled gas usually injected upstream of the catalyst beds after the first bed.

Figure 3:
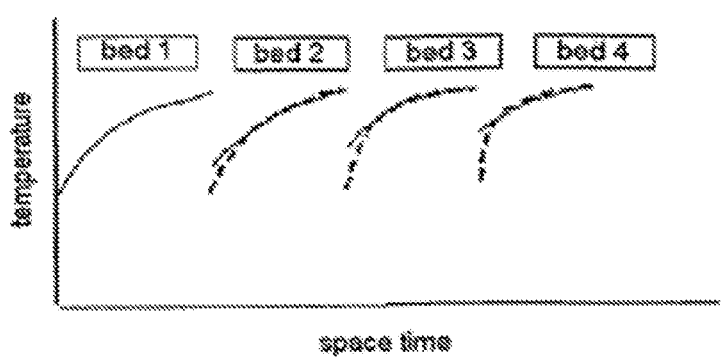
FIG. 3 illustrates the temperature profile observed in the successive catalyst beds in a hydrotreatment unit.

FIG. 3 illustrates the temperature profile observed in the successive catalyst beds in a hydrotreatment unit when only the catalyst beds after the first have their profiles modified (broken lines).

Below, with the help of the diagram in FIG. 1 which illustrates an HDT unit with four catalyst beds, without limiting the present invention, the process for hydroconversion of a mixture of organic oils of different origins utilizing a conventional hydrotreatment unit is described.

This unit should be constituted by at least two catalyst beds, and operate under moderately severe process conditions to obtain diesel oil.

The process applies to processing of mixtures of organic oils of different origins, i.e. of animal and/or plant origin, co-processed in a proportion of 5 to 30% by volume with a feedstock originally constituted by mineral oil, adding volume to the diesel oil produced in the unit.

A stream of mineral oil (2) is pressurized by a pump (201), which raises the pressure of the stream to the process pressure. A stream (102) is produced which passes through heat exchangers (204) and (203), which heat the stream (102) of mineral oil and cool the product stream (107) resulting from the reactions in the process. The heated mineral oil (103) is mixed with a stream of gas (119) rich in hydrogen, which can be gas recycled from the process mixed with replenishing hydrogen (6) to give a mixture (104). The mixture (104) is heated in a furnace (205), to give a stream (105), to the inlet temperature of a first catalyst bed (211) [and] is introduced upstream of the catalyst bed. A stream of organic oil of animal and/or plant origin (1) is pressurized by a pump (202), and produces a stream (124) at the process pressure. This stream (124) can undergo controlled subdivision into one or more streams (125), (126) and (127), which are injected at independently adjusted flow rates in accordance with the variations in temperature observed in each of the catalyst beds (212) (213) and (214) after the first catalyst bed (211), upstream of each one of the respective beds. As a result of the exothermic reactions in the catalyst beds, a product stream (107) produced in the process is at a high temperature. This energy is recovered for heating the mineral oil feedstock (2) by heat exchangers (203) and (204), producing a product stream (109), which is cooled in a heat exchanger (207), producing a multiphase stream (110) which is directed to a container (208), where it is separated into: a) a liquid fraction (112) of hydrocarbons and dissolved gases, which is forwarded to a rectification column (not shown) to remove hydrogen sulfide and ammonia gas, produced by the hydrodesulphurization and hydrodenitrogenation reactions, respectively;

b) a gaseous fraction (113) rich in unreacted hydrogen, which constitutes a recycled stream (117) in the process after passing in succession through a purging system (5) for hydrogen sulfide gas, a container (209) to remove liquid and a compressor (210) to raise the pressure to process pressure; c) a water fraction (111) which is forwarded to a system (3) for treating acid water from the refinery. A stream of replenishing hydrogen (6) is introduced into the recycled stream (117) in order to compensate the hydrogen consumed by losses and by the reactions and produces a gaseous stream (118) which is subdivided into at least two streams (119) and (120), which respectively mix with the mineral oil stream (103) before entering the furnace (205), and inject the streams of gas (122), (123) and (121) upstream of the catalyst beds (212), (213) and (214), with the objective of decreasing the temperature of the streams in the catalyst bed and increasing the partial pressure of hydrogen needed for the hydroconversion reactions.

The experiments carried out during the development of the process suggest that for hydroconversion of organic oil of animal and/or plant origin, hydrogenation reactions of the double bonds of the hydrocarbon molecules must occur first, followed by thermal cracking reactions of the saturated molecules, which have higher melting points. Since hydrogenation of double bonds occurs at high velocities, even under conditions of low severity (pressure and temperature), saturation of the oil molecules should occur before thermal cracking. The size of the saturated molecules favors thermal cracking under high temperature conditions, producing carboxylic acids, cetane and acrolein. The carboxylic acids produced may be thermally degraded via decarboxylation reactions, resulting in nC17 and $CO_2$. Decarbonylation reactions also occur, producing nC17, CO and water, and there are also dehydration reactions, producing nC18 and water. The acrolein is saturated and dehydrated in the presence of the catalyst and the hydrogen, producing methane and water. The CO produced by the decarbonylation of the fatty acids is reduced in the presence of the catalyst and the hydrogen, producing methane and water.

Below, the results of tests are presented, which show the advantages of the process of the present invention.

Tests conducted in a pilot HDT plant, operating isothermally, to produced diesel oil, show that co-processing organic oil of animal and/or plant origin together with mineral oil contributes positively to the quality of the product, as shown by the results in Table 2 for an oil A (diesel oil) and an oil B (diesel oil mixed with 10% soybean oil).

TABLE 2

| Property | Oil A | Oil B |
| --- | --- | --- |
| Suphur, mg/kg | 468 | 367 |
| Cetane number | 41.8 | 50.5 |
| Distillation D86, T 90%, ° C. | 385.5 | 378.3 |
| Viscosity at 20° C., $mm^2/s$ | 16.350 | 13.480 |
| Density | 0.8867 | 0.8763 |

The improvement in the quality of the product can be attributed to the dilution of the product of hydrotreatment of mineral oil (stream in the diesel distillation temperature range) by the product of hydrotreatment of plant oil (soybean oil), since this oil has a low concentration of nitrogen compounds and does not contain sulfur compounds or aromatic hydrocarbons.

Based on various experiments, it can be said that the product of hydroconversion of organic oil of plant and/or animal origin is fundamentally constituted by normal paraffins and water, which adds quality to diesel oil obtained by the process of the present invention.

The selectivity of the process with respect to normal paraffins is related to the composition of the carboxylic acids in the organic oil of animal and/or plant origin used.

Table 3 shows that the yield of normal paraffins (nC15 to nC18) is independent of the operating conditions (temperature, pressure and LHSV space velocity) of the hydrotreatment process.

TABLE 3

| | Pressure MPa | Temperature ° C. | LHSV $h^{-1}$ | nC15 | C16 | nC17 | nC18 |
| --- | --- | --- | --- | --- | --- | --- | --- |
| Test 1 | 5.5 | 350 | 2.20 | 0.21 | 0.29 | 1.28 | 1.22 |
| Test 2 | 5.5 | 350 | 1.00 | 0.40 | 0.35 | 1.14 | 1.11 |
| Test 3 | 5.5 | 370 | 1.00 | 0.24 | 0.36 | 1.26 | 1.14 |
| Test 4 | 5.5 | 370 | 2.20 | 0.34 | 0.24 | 1.27 | 1.15 |

In order to evaluate the yield of gaseous products a test was performed in a pilot unit with gas recycling (Test 5), as in the industrial unit and it was confirmed that the yields of gaseous products are not related to the operating conditions, noting especially the production of 1 mol of propane per mol of soybean oil processed. This behavior can be observed in the results of Tests 1 and 5, carried out under different operating conditions, presented in Table 4, which shows that the yield of C3 and $CO_2$ are unchanged. The differences noted in yields of C1 and CO are due to conversion of CO into C1, since Test 5 was carried out with hydrogen recycling.

TABLE 4

|  | C1 | C3 | CO | $CO_2$ |
|---|---|---|---|---|
| Test 1 | 0.36 | 0.95 | 0.52 | 0.40 |
| Test 5 | 0.97 | 0.95 | 0.02 | 0.41 |

Tests 6-9 below illustrate the results of tests which compare the temperature profiles of the reactors with a feedstock of diesel oil mixed with 10% by volume of soybean oil under the operating conditions of the experiments:
a) LHSV space velocity=2.2 $h^{-1}$
b) Pressure=5.5 MPa
c) $H_2$/load=275 NL/L feedstock

TABLE 5

| | Soybean oil % volume | ΔT °C. | T initial °C. | S mg/kg | N mg/kg | Density 20/4° C. |
|---|---|---|---|---|---|---|
| Test 6 | 0 | 23.9 | 352 | 283 | 748 | 0.8859 |
| Test 7 | 0 | 24.5 | 352 | 328 | 877 | 0.8863 |
| Test 8 | 10 | 47.8 | 353 | 184 | 620 | 0.8755 |
| Test 9 | 10 | 48.7 | 355 | 197 | 751 | 0.8755 |

The low sulfur content obtained in tests 8 and 9 can be explained by the high average operating temperature compared with tests 6 and 7. The lower density of the product in the tests with soybean oil shows that the oil was converted into normal paraffins as a result of the reactions of the plant oil during the HDT process.

Figure 4:
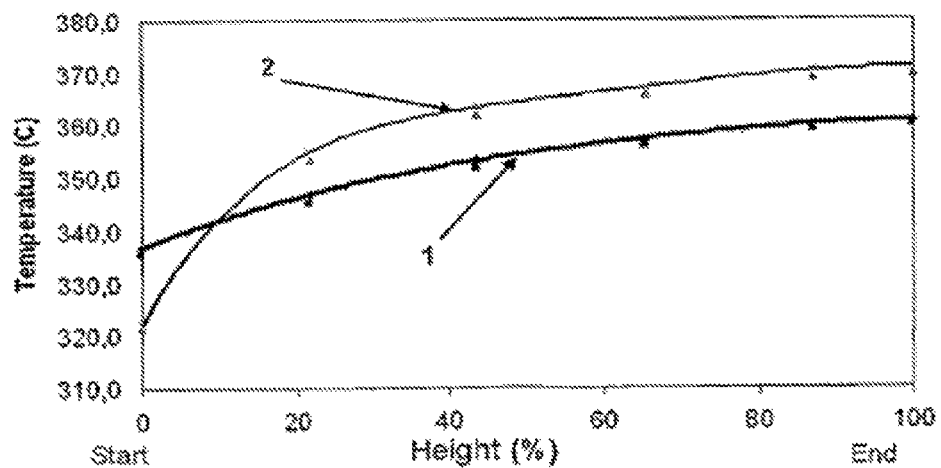
FIG. 4 illustrates experiments conducted in a pilot plant, operating adiabatically.

In experiments conducted in a pilot plant, operating adiabatically, high reaction rates are observed for soybean oil; and this oil undergoes practically complete conversion in the first catalyst bed, as illustrated in FIG. 4.

Therefore, complete conversion of organic oil of animal and/or plant origin can be expected in the first layers of the catalyst bed, where curve 1 corresponds to the adiabatic temperature profile for processing pure mineral oil and curve 2 is the temperature profile for a feedstock containing soybean oil at 10% by volume.

Tests 10-11 below illustrate the results of tests which compare the temperature profiles of the reactors with a feedstock of diesel oil mixed with 10% by volume of soybean oil under the operating conditions of the experiments:
d) LHSV space velocity=2.2 $h^{-1}$
e) Pressure=8.0 MPa
f) $H_2$/load=500 NL/L feedstock

TABLE 6

| | Soybean oil % volume | ΔT °C. | T initial °C. | S mg/kg | N mg/kg | Density 20/4° C. |
|---|---|---|---|---|---|---|
| Test 10 | 10 | 32 | 330 | 9.42 | 29.7 | 0.8681 |
| Test 11 | 0 | 53 | 317 | 223 | 484 | 0.8840 |

Analysis of Table 6 reveals that the higher levels of conversion of sulfur and nitrogen compounds were obtained due to the higher average temperature in the test with a higher content of plant oil, the conversion of which is reflected in the decrease in the density of the final product.

Figure 5:
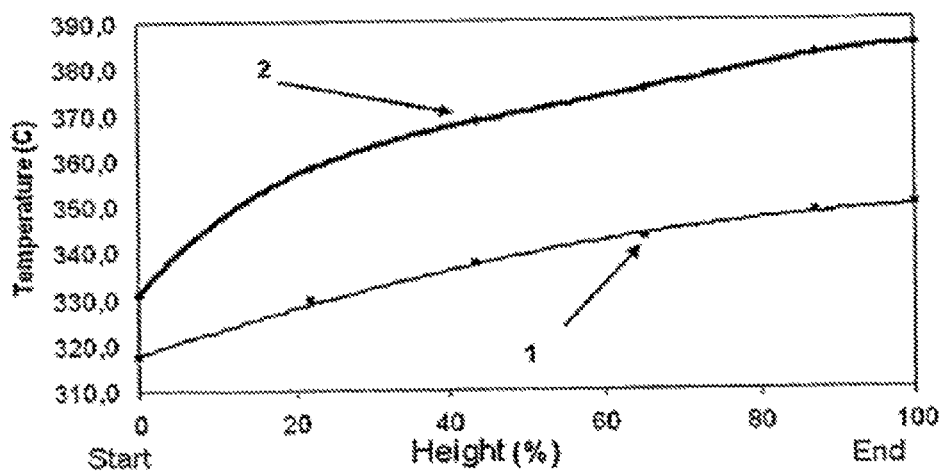
FIG. 5 represent the temperature profiles in tests 11 and 10, respectively.

In FIG. 5, curves 1 and 2 represent the temperature profiles in tests 11 and 10, respectively, indicating that increasing the pressure to 8.0 MPa did not alter the profile produced by soybean oil: in other words, the soybean oil is completely converted in about 20% of the catalyst bed.

Therefore, the description of the present invention demonstrates the technical solution for the process of hydroconversion of a mixture of organic oils of different origins which overcomes the problem of the highly exothermic nature of the reactions of oils of animal or plant origin, which process includes the injection of a stream of oil of animal and/or plant origin, at independently adjusted rates, beginning from a second catalyst bed in the hydrotreatment unit.

The invention claimed is:

1. A process for hydroconversion of a mixture of a mineral oil and one or more organic oils in a hydrotreatment unit comprising at least two catalyst beds to obtain specified diesel fuel oil, which comprises:
    (a) injecting a mineral oil upstream of a first catalyst bed for subsequent passage through one or more subsequent catalyst beds in the presence of a stream comprising hydrogen, obtaining hydrotreating reaction products;
    (b) injecting, at rates adjustable independently, one or more organic oils of animal and/or plant origin, in an amount from 5 to 30% by volume of total feedstock, upstream of the catalyst beds after the first bed, for reaction of the admixture of said one or more organic oils of animal and/or plant origin and said hydrotreating reaction products which passes over all of the subsequent catalyst beds, wherein the flow rates are adjusted in accordance with variations in temperature seen in the or each of the catalyst beds after the first bed;
    (c) obtaining hydroconversion products, and separating an efflux downstream of the catalyst beds into: a) a liquid water fraction b) a gaseous fraction, which is recycled within the process; and c) a liquid fraction of hydrocarbons and dissolved gases; and
    (d) removing the dissolved gases from fraction c) and recovering a specified diesel fuel oil having a cetane number greater than 42 and a relative density less than 0.88.

2. A process according to claim 1, wherein the process includes one or more of the following steps: (a) pressurizing a stream of mineral oil (2) by means of a pump (201), which raises the pressure of this stream to the process pressure and produces a stream (102);
    (b) passing the stream (102) through one or more heat exchangers (204) and (203), to heat the stream (102) and/or cool the product stream (107) resulting from the reactions in the process, producing a stream of heated mineral oil (103);
    (c) mixing the stream of heated mineral oil (103) with a gaseous stream (119) comprising hydrogen, which can be gas recycled from the process mixed with replenishing hydrogen (6), to produce a mixture (104); (d) heating the mixture (104) in a furnace (205) to the inlet temperature of a first catalyst bed (211), which processes only the mixture (104), heated, identified as a stream of mineral oil (105) introduced upstream of the catalyst bed;
    (e) pressurizing a stream of one or more organic oils (1) of animal and/or plant origin by means of a pump (202), and producing a stream (124) at the process pressure;
    (f) subdividing the stream (124) in a controlled manner into two or more streams (125), (126) and (127), which are injected at independently adjustable rates in accordance with the variations in temperature or other variations observed in each of the catalyst beds (212), (213) and (214) after the first catalyst bed (211), upstream of each of the respective beds;

(g) recovering energy of the product stream (107) produced in the process by heating of the mineral oil feedstock (2) by the heat exchangers (203) and (204), producing a product stream (109);

(h) cooling the product stream (109) in a heat exchanger (207) producing a multiphase stream (110), which is forwarded to a container (208) for separation of one or more of:
  (i)(a) a liquid fraction (112) of hydrocarbons and dissolved gases, which is forwarded to a rectification column to remove hydrogen sulphide and ammonia gas;
  (ii)(b) a gaseous fraction (113) comprising, and preferably rich in, unreacted hydrogen, which constitutes a recycled stream (117) for the process after passing in succession through a purging system (5) for hydrogen sulphide gas, a container (209) to remove liquids, and a compressor (210) to raise the pressure to process pressure;
  (iii)(c) a water fraction (111), which is forwarded to a system (3) for treating acid water from the refinery;

(i) introducing a stream of replenishing hydrogen (6) into the recycled stream (117) thereby at least partially compensating for hydrogen consumed by losses and/or by the reactions, producing a gaseous recycled stream (118) which is subdivided into at least two gas streams (119) and (120), which mix with the mineral oil stream (103) before entering a furnace (205) and in order to inject upstream of the catalyst beds (212), (213) and (214), with the objective of decreasing the temperature of the streams in the catalyst bed and increasing the partial pressure of hydrogen needed for the hydroconversion reactions; and (j) recovering a specified diesel oil.

3. A process according to claim 2, characterized in that the process conditions include a catalyst bed of metal oxide supported on gamma alumina, sulphided, a temperature of 280 to 370° C., a partial pressure of hydrogen of 4 to 10 MPa and a space velocity of 0.5 and 2.5 $h^{-1}$.

4. A process according to claim 2, characterized in that the organic oils of animal and/or plant origin correspond to a proportion of 5 to 30% by volume of the total feedstock processed.

5. A process according to claim 1, characterized in that the process conditions include a catalyst bed of metal oxide supported on gamma alumina, sulphided, a temperature of 280 to 370° C., a partial pressure of hydrogen of 4 to 10 MPa and a space velocity of 0.5 and 2.5 $h^{-1}$.

6. A process according to claim 5, characterized in that the organic oils of animal and/or plant origin correspond to a proportion of 5 to 30% by volume of the total feedstock processed.

7. The process of claim 5, wherein the metal oxide is of Ni and Mo, and/or Co and Mo, and/or Ni and W.

8. A process for hydroconversion of a mixture of organic oils of different origins according to claim 1, wherein the organic oils of animal and/or plant origin comprise one or more of soybean oil, castor oil, palm oil and peanut oil.

9. A process according to claim 8, wherein the organic oil of plant origin comprises soybean oil.

10. A process according to claim 1, wherein the organic oils of animal and/or plant origin comprise one or more animal oil having a concentration of fatty acids greater than 85%.

11. A process for hydroconversion of a mixture of organic oils of different origins, in a hydrotreatment unit constituted by at least two catalyst beds and under moderately severe process conditions, to obtain diesel fuel oil, comprising the steps of:

a) providing mineral oil to inject upstream of a first catalyst bed of a reactor of a hydrotreatment unit, under process conditions, and pass through the subsequent catalyst beds of the unit for catalytic hydroconversion in the presence of a stream rich in hydrogen;
  b) providing organic oil of animal and/or plant origin to inject at rates adjustable independently, upstream of the catalyst beds after the first bed, and to react in a concurrent mixture with the stream of mineral oil which passes over all of the subsequent catalyst beds of the unit following the hydroconversion reactions of the constituents, wherein the flow rates are adjusted in accordance with variations in temperature seen in the or each of the catalyst beds after the first bed;
  c) obtaining products of the hydroconversion reactions and separating the efflux into: a) a liquid water fraction b) a gaseous fraction, which is recycled to the reaction; c) a liquid fraction of hydrocarbons and dissolved gases; and
  d) removing the dissolved gases in the liquid fraction of hydrocarbons and dissolved gases and recovering a product specified as diesel fuel oil, with a cetane number greater than 42 and a relative density less than 0.88.

* * * * *